No. 886,013.

J. T. H. PAUL.
PASTEURIZING APPARATUS.
APPLICATION FILED JULY 25, 1907.

PATENTED APR. 28, 1908.

10 SHEETS—SHEET 1.

No. 886,013.

J. T. H. PAUL.
PASTEURIZING APPARATUS.
APPLICATION FILED JULY 25, 1907.

PATENTED APR. 28, 1908.

10 SHEETS—SHEET 2.

No. 886,013. PATENTED APR. 28, 1908.
J. T. H. PAUL.
PASTEURIZING APPARATUS.
APPLICATION FILED JULY 25, 1907.
10 SHEETS—SHEET 3.

No. 886,013. PATENTED APR. 28, 1908.
J. T. H. PAUL.
PASTEURIZING APPARATUS.
APPLICATION FILED JULY 25, 1907.
10 SHEETS—SHEET 4.
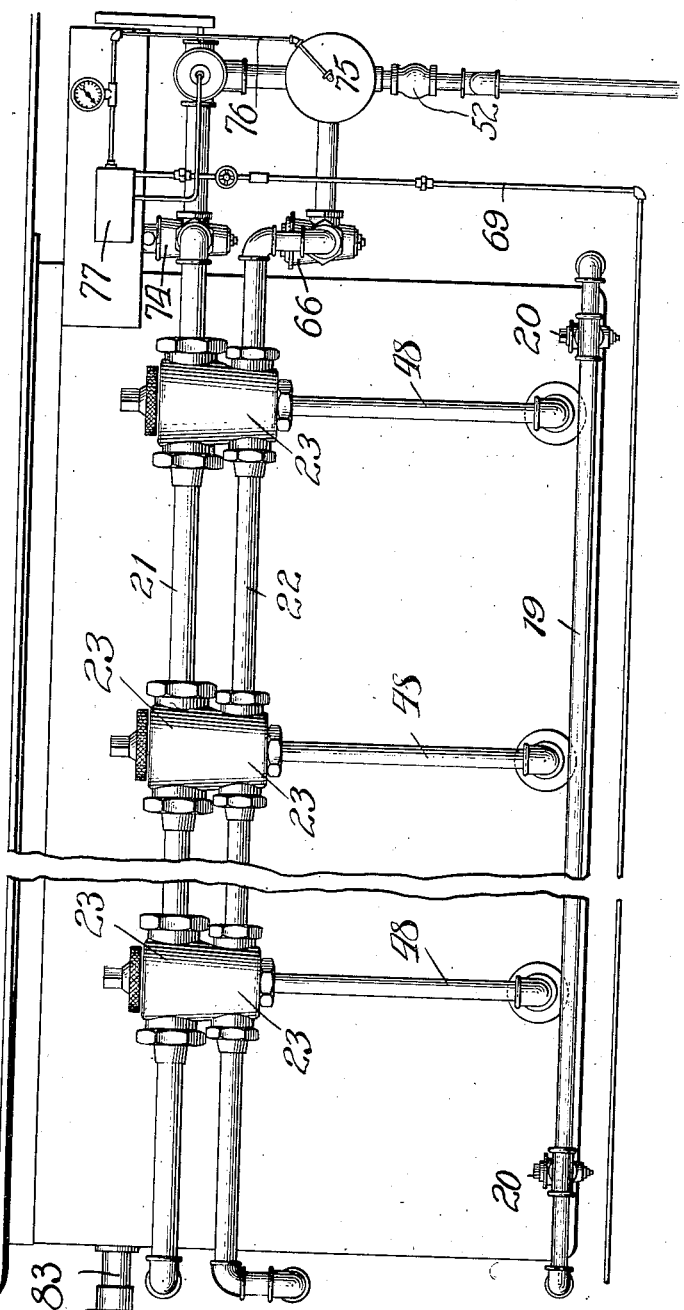
Fig. 4.
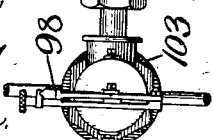
Witnesses:
Chas. E. Taylor,
John Enders.
Inventor:
John T. H. Paul,
By Dyrenforth, Lee, Chritton and Wiles,
Attys.

No. 886,013. PATENTED APR. 28, 1908.
J. T. H. PAUL.
PASTEURIZING APPARATUS.
APPLICATION FILED JULY 25, 1907.
10 SHEETS—SHEET 5.
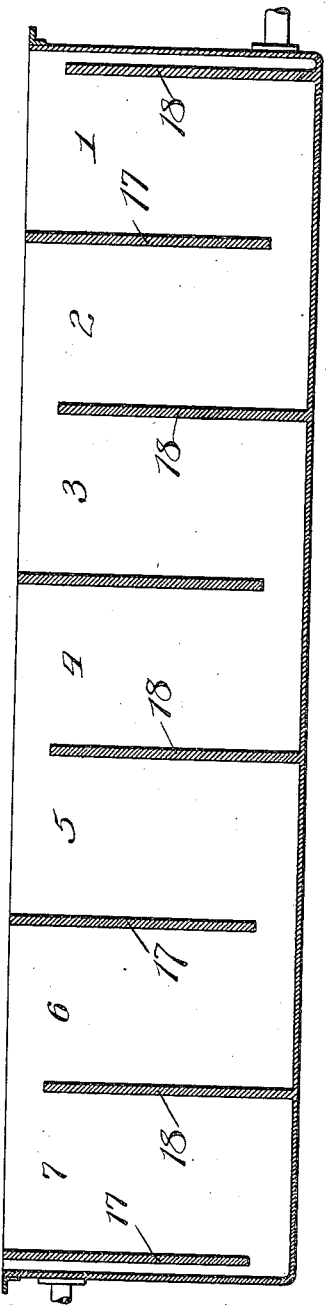
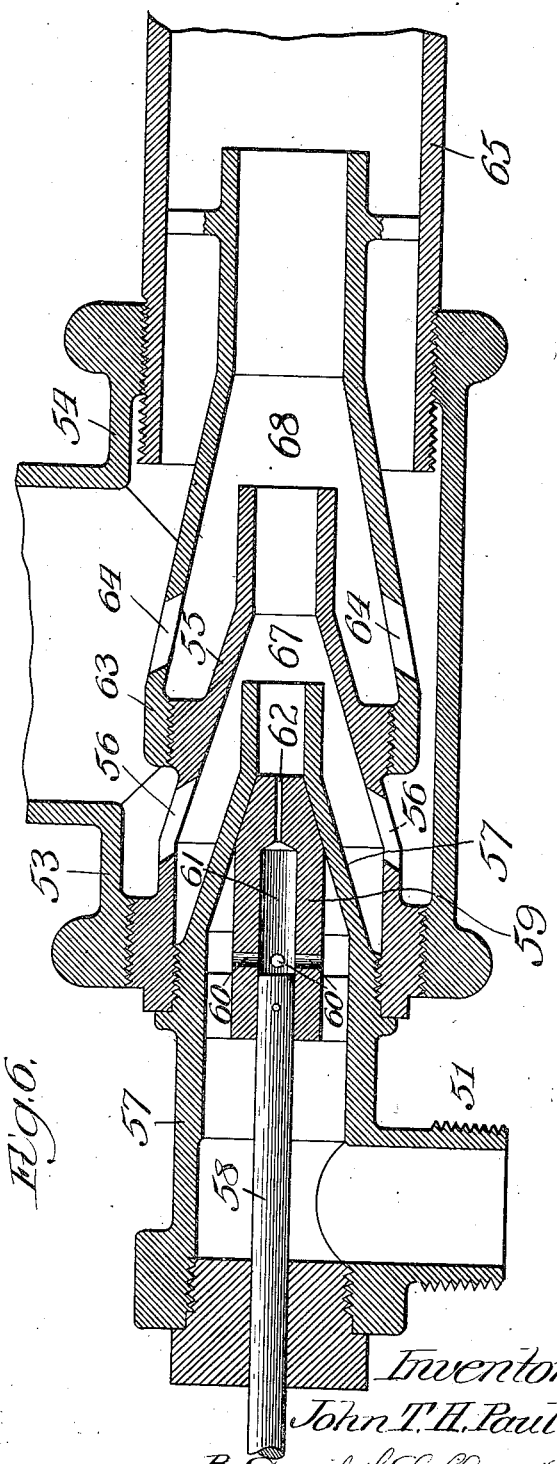
Witnesses:
Chas. Gaylord.
John Enders.
Inventor:
John T. H. Paul
By Dyrenforth, Lee, Chritton & Wiles,
Attys.

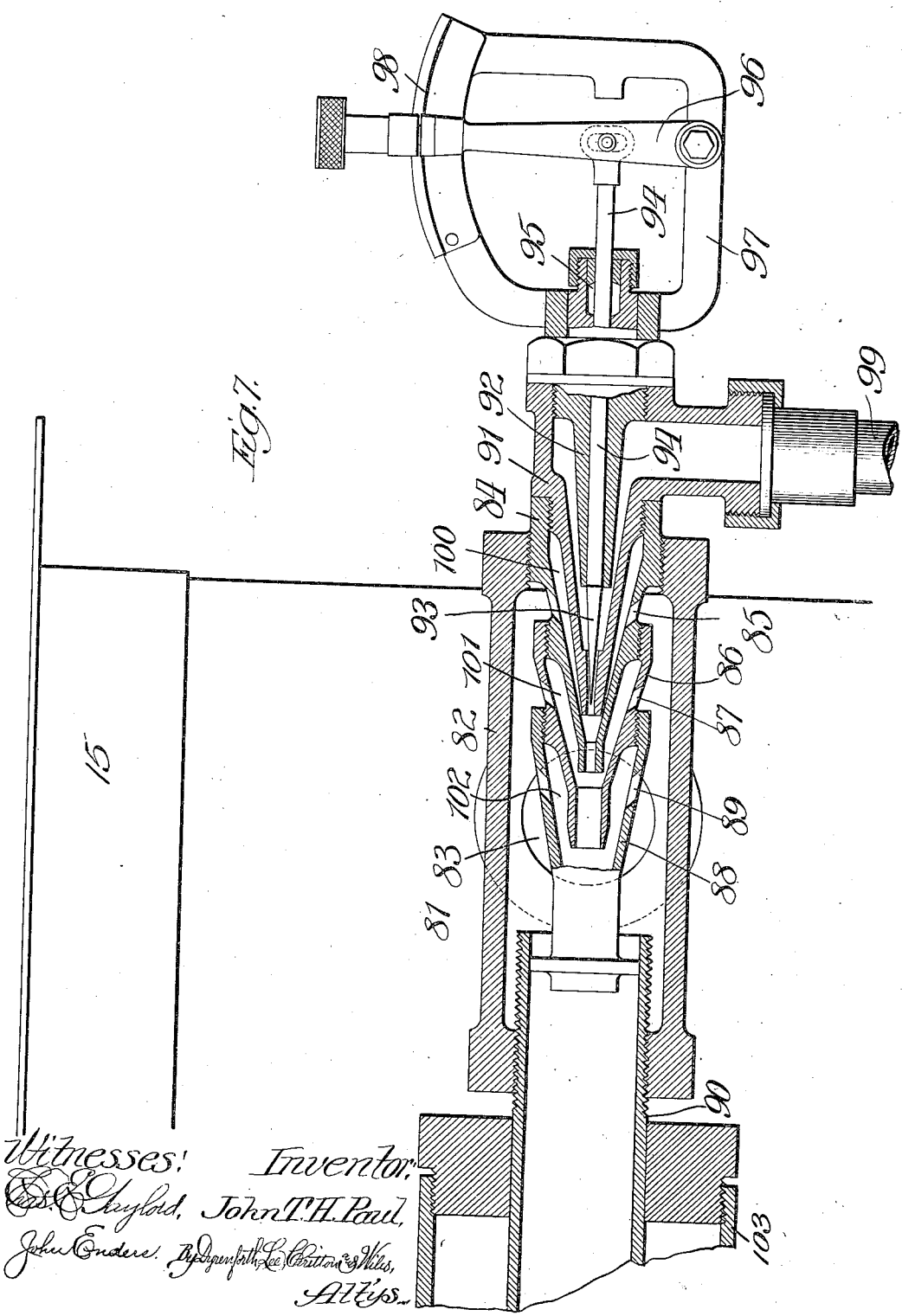

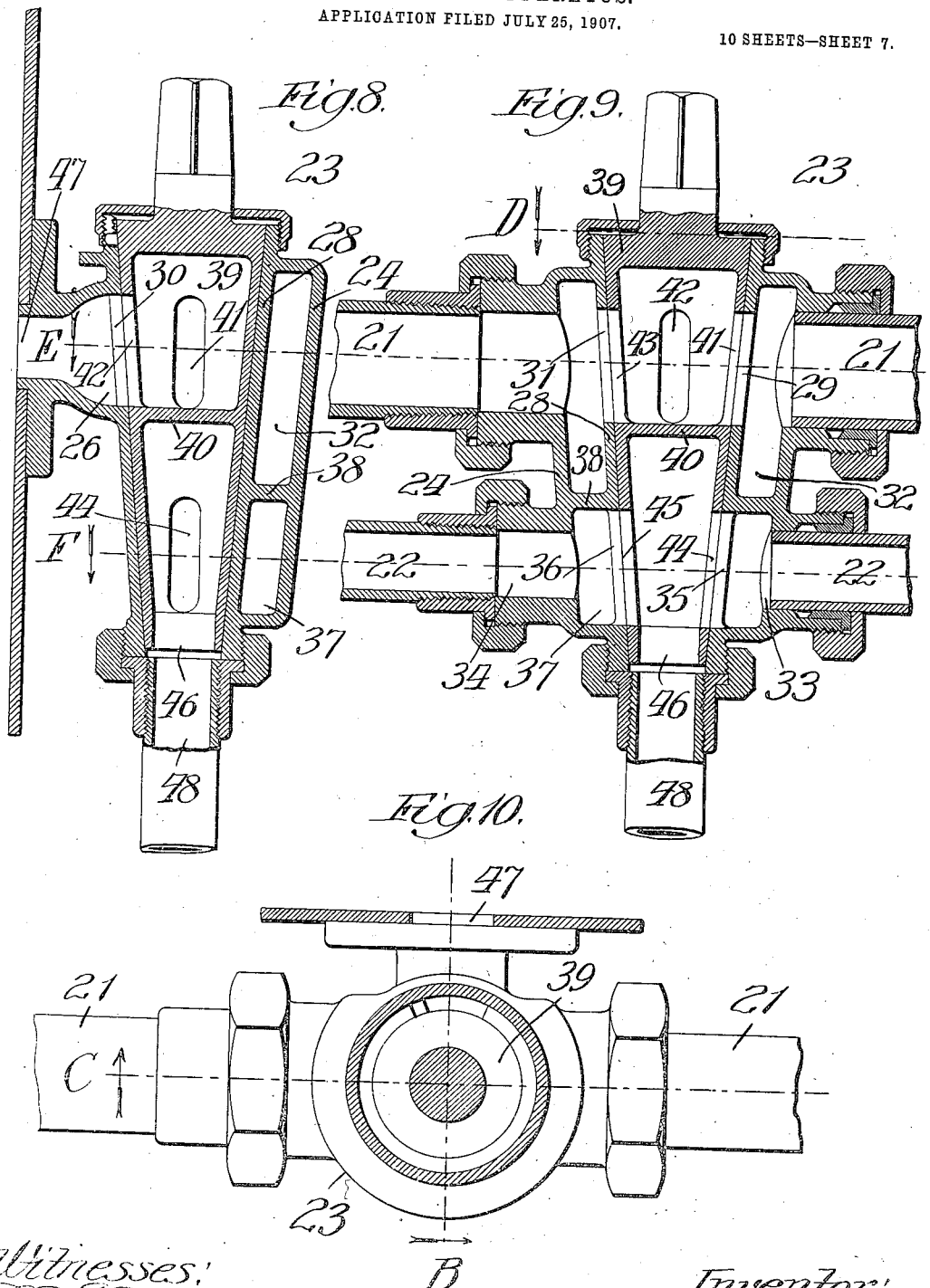

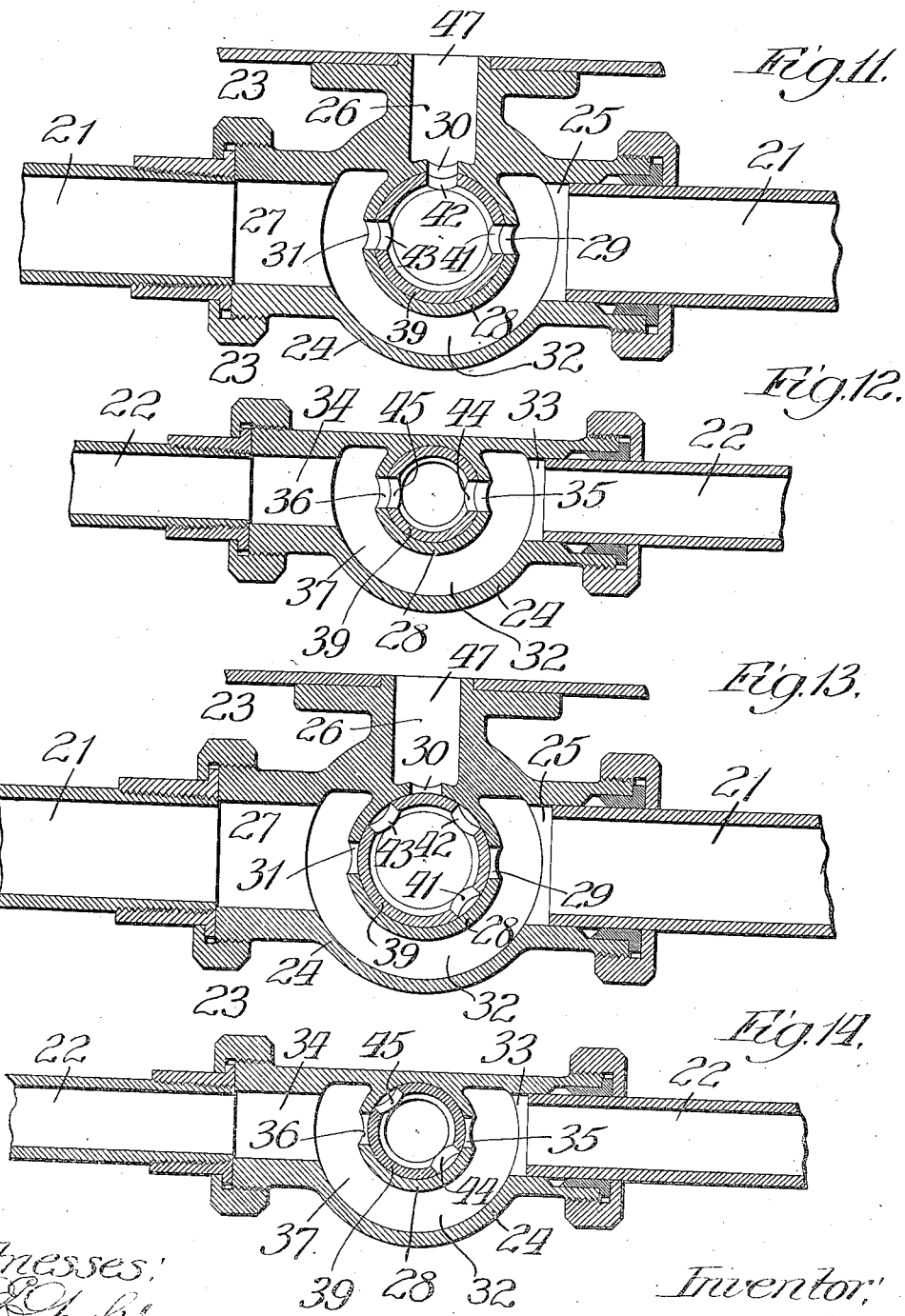

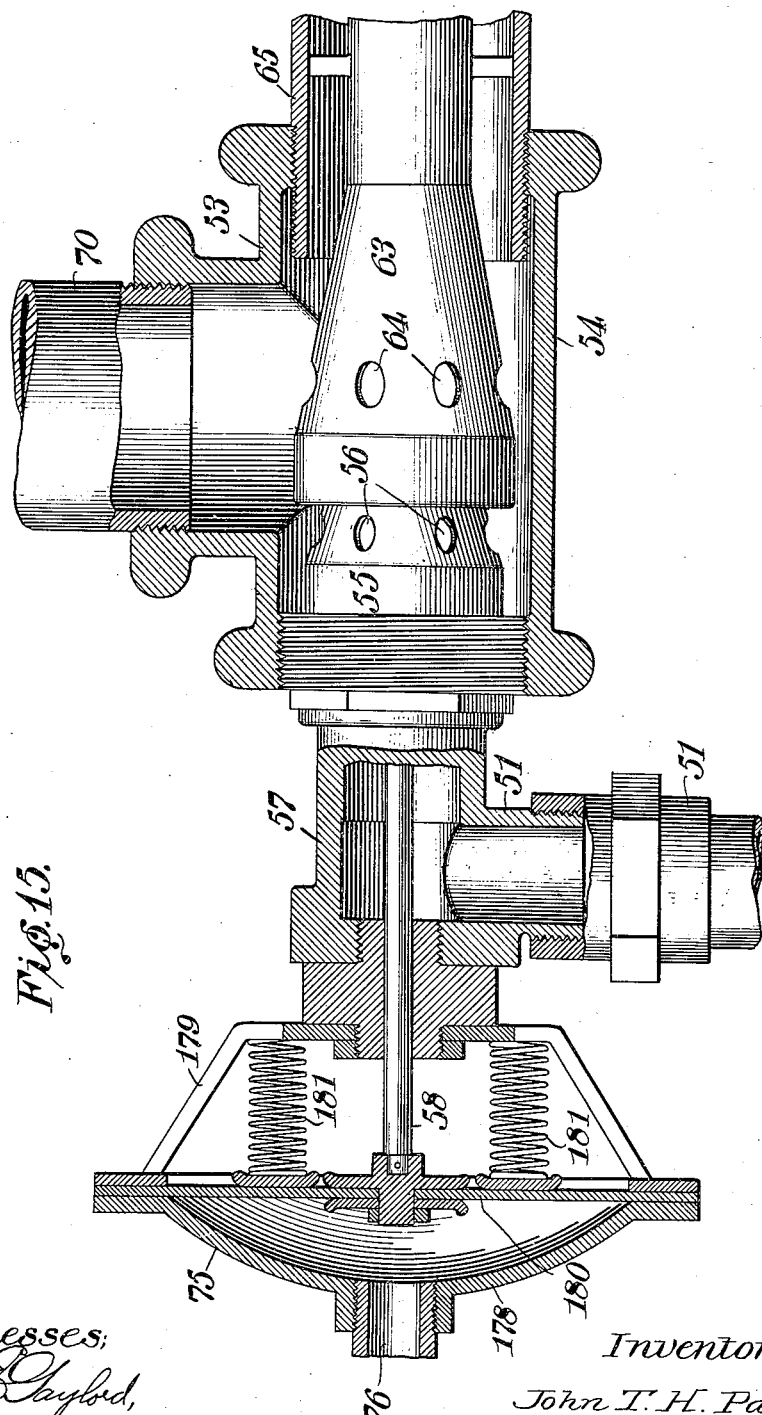

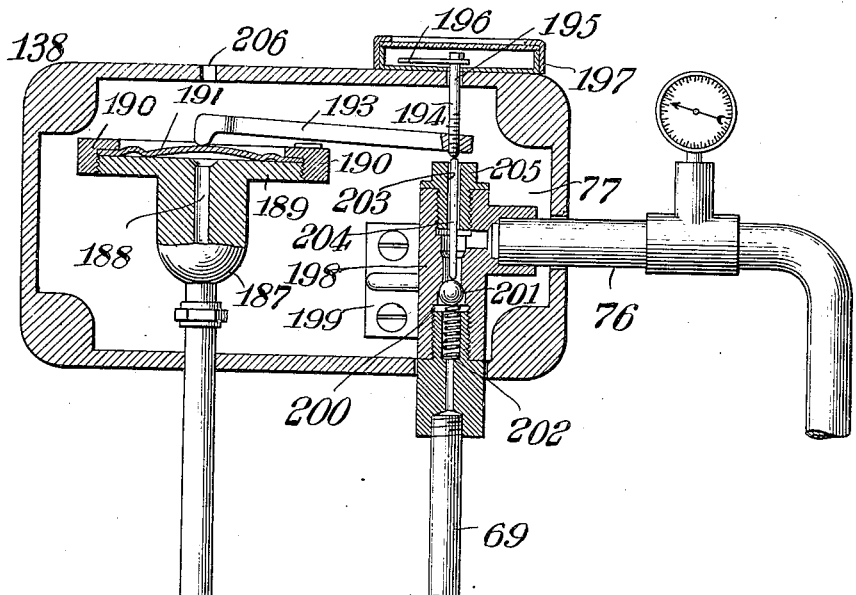

UNITED STATES PATENT OFFICE.

JOHN T. H. PAUL, OF CHICAGO, ILLINOIS, ASSIGNOR TO E. GOLDMAN & CO. INC., OF CHICAGO, ILLINOIS, A CORPORATION OF ILLINOIS.

PASTEURIZING APPARATUS.

No. 886,013.  Specification of Letters Patent.  Patented April 28, 1908.

Application filed July 25, 1907. Serial No. 385,460.

*To all whom it may concern:*

Be it known that I, JOHN T. H. PAUL, a citizen of the United States, residing at Chicago, in the county of Cook and State of Illinois, have invented new and useful Improvements in Pasteurizing Apparatus, of which the following is a specification.

This invention relates to improvements in pasteurizing apparatus of the class in which the pasteurizing liquid contained in a series of intercommunicating tanks or compartments is preliminarily heated to the sterilizing temperature in a number of consecutive members of the series, to be thereafter continuously circulated throughout the series for subjecting the material to be treated, successively introduced into such members, to different stages of temperature of the pasteurizing liquid; thereby rendering the operation of the apparatus continuous, in the sense that all of the members of the series may, during the operation, be in simultaneous use.

Figure 1:
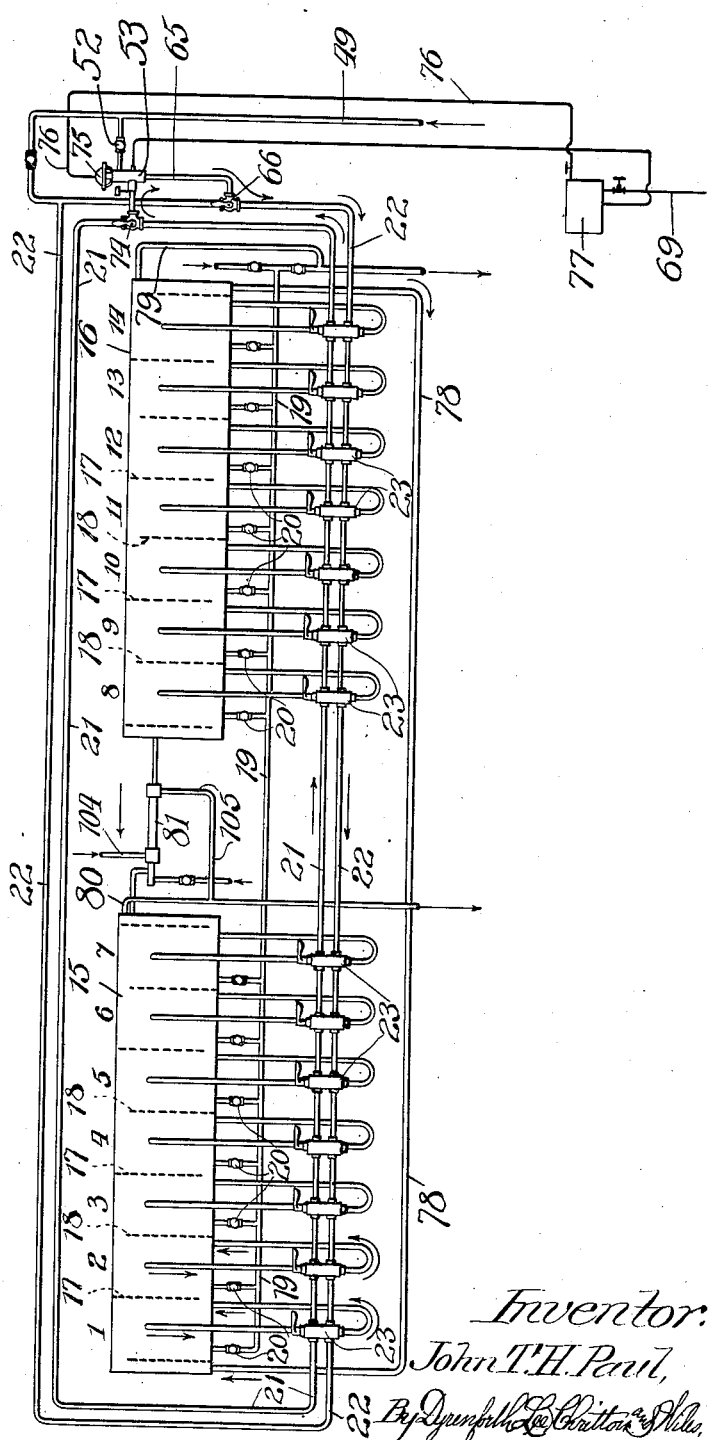
Figure 2:
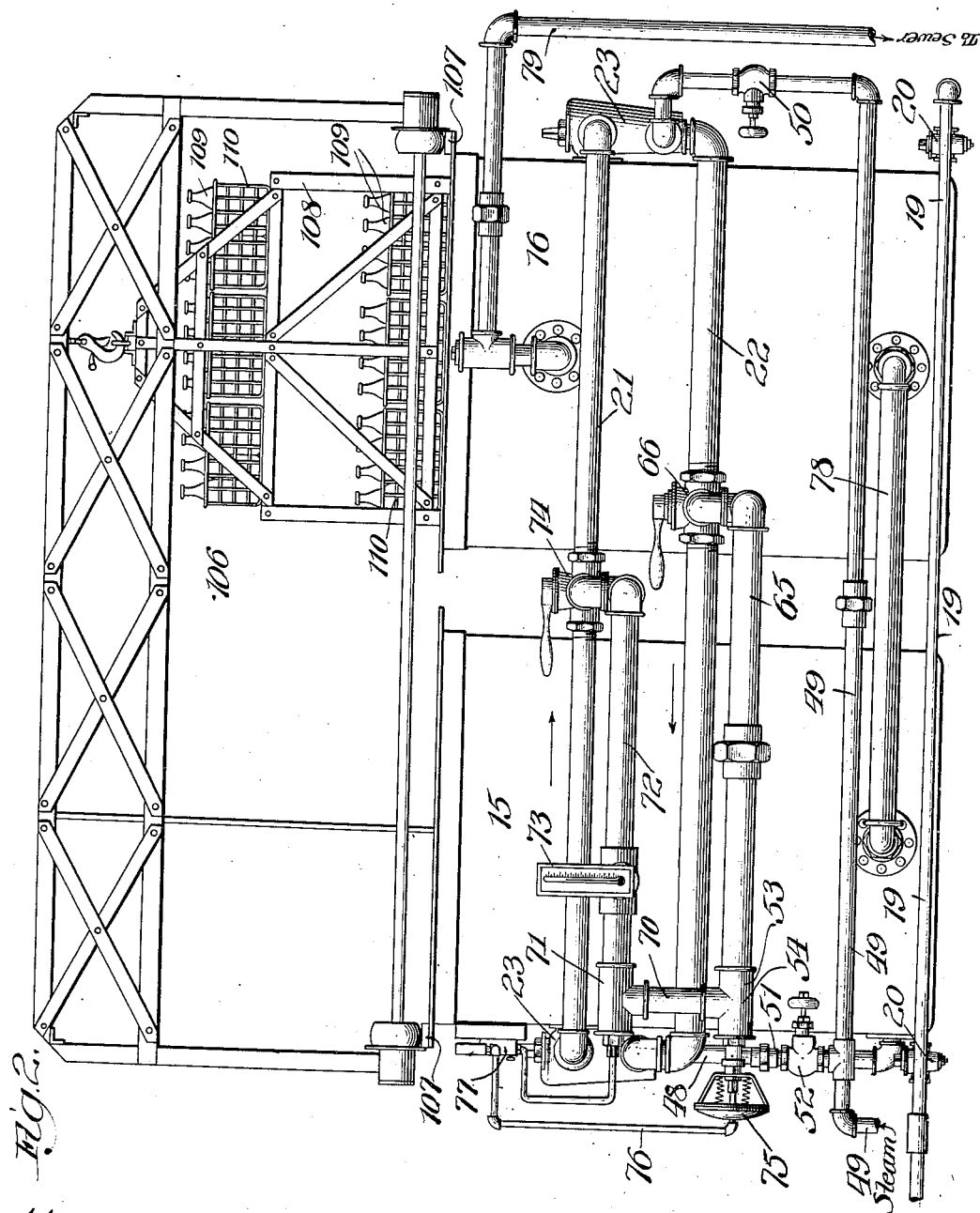
Figure 3:
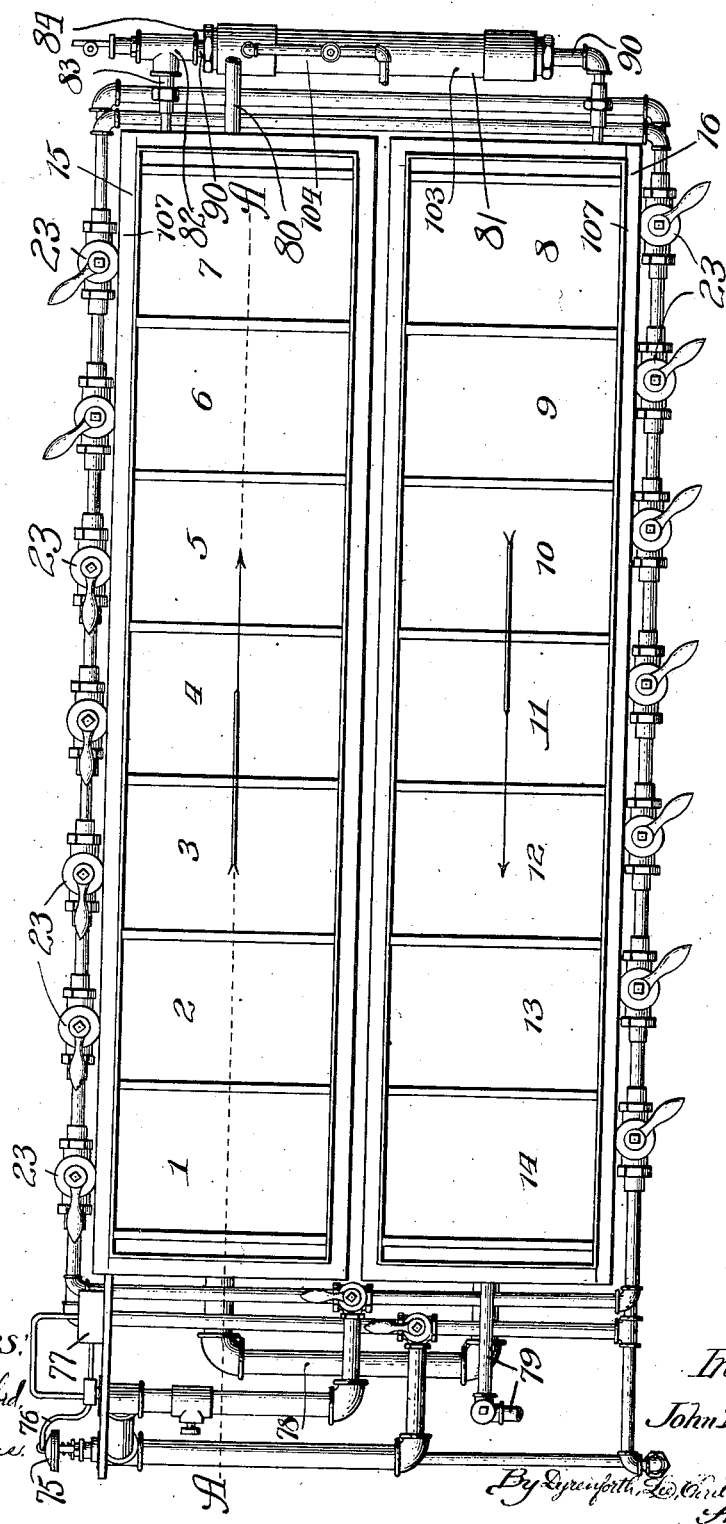

Referring to the accompanying drawings—Figure 1 shows the improved apparatus by a diagrammatic view. Fig. 2 is an end elevation of the apparatus surmounted by a traveling gauntree; Fig. 3, a plan view, and Fig. 4, a broken side view of the apparatus. Fig. 5 is a longitudinal vertical section through one of the two tanks employed, taken at the line A on Fig. 3. Fig. 6 is a broken longitudinal section showing the construction of the steam-jet pump employed for heating the liquid; and Fig. 7 is a similar view showing the construction of the steam-jet pump employed for circulating the liquid throughout the series of compartments. Figs. 8 and 9 are sections taken at right angles to each other, respectively, at the lines B and C on Fig. 10, showing the construction of valve employed for controlling the flow to and from each compartment under the action of the heating pump; and Fig. 10 is a sectional view of the same valve at line D on Fig. 9. Figs. 11 and 13 are sections of the same valve taken at the line E on Fig. 8 through its upper part and showing the ports in open and closed positions respectively; and Figs. 12 and 14 are similar sections through the lower part of the valve at line F on Fig. 8, showing the ports in open and closed position, respectively. Fig. 15 is a broken sectional view of the diaphragm-device employed in the system shown connected with the steam-jet heating-pump of Fig. 6, and Fig. 16 is a view in elevation mainly sectional and diagrammatic in its nature, of the spring-seated valve-device and thermostat, also employed in the system.

The apparatus, while intended for use in pasteurizing sauces, catsup, preserves, and canned or bottled goods of all kinds, requiring to be sterilized to afford to them the necessary keeping quality, rather than treated with preservative chemicals, has been more particularly devised for sterilizing beer in bottles, to the treatment of which, therefore, the description hereinafter contained is confined.

Two similar tanks 15 and 16, of desired capacity, are placed side-by-side, though so far as the purview of the invention is concerned a single tank may be used where its length would not cause it to take up too much room. Partitions 17 extending between the walls of each tank from their upper ends and short of the tank-bottom, and alternate partitions 18 rising from said bottom and extending short of the tops of the side-walls, divide the tanks into similar compartments, preferably to the same number in each tank to afford through it a serpentine course for circulating the water employed in the sterilizing treatment. It will be observed that the end-partitions 17 and 18 are close to the end-walls of the tanks and afford narrow spaces with said walls for the purpose hereinafter explained. Each tank is shown to be sub-divided into seven compartments, making fourteen in all, but that number may be decreased or increased according to particular requirements for which the apparatus may be constructed.

A cold-water supply-pipe 19 extends along the outer side and one end of each tank at the base thereof and communicates with the interior of the tanks through branches containing valves 20, which may be of the straight-way variety, seven such branches being shown to be provided for each tank according to the representation in the diagrammatic view. Two similar pipes 21 and 22 extend endlessly about both tanks above their centers, along their sides and across their ends, being sufficiently close together along the tank-sides to permit a single valve-device 23, hereinafter described, to be interposed in both. The valve-device referred to is shown in detail in Figs. 8 to 14, inclusive, and involves the following-described construction: The valve-casing is formed with an outer wall 24 containing ports 25, 26 and 27 in its upper portion, and an inner wall 28 containing a port 29 registering with the port 25, a port 30 registering with the port 26, and a port 31 registering with the port 27, these walls forming between them a by-pass chamber 32 extending part-way about the interior of the casing. The lower section of the casing is formed with a continuation of the outer wall 24 containing opposite ports 33 and 34, and with a continuation of the inner wall 28 containing the opposite ports 35 and 36, these lower sections of the walls forming between them a by-pass passage 37, extending like the passage 32, but divided therefrom by a horizontal partition 38 (Figs. 8 and 9). The valve-plug 39 is divided by a partition 40 into an upper section to fit rotatably in the corresponding sections of the casing and containing the three ports 41, 42 and 43, and a lower section to fit similarly within the corresponding section of the casing and containing the lateral ports 44 and 45 and the end-port 46 at the open lower end of the lower casing-section.

Coincident with each compartment in a tank, a valve-device 23 is interposed in the two pipes 21 and 22 by coupling into the pipe 21 at the ports 25 and 27 and by coupling into the pipe 22 at the ports 33 and 34, each valve-device being secured at the flanged side of its casing to a side-wall of a tank wherein a port 47 is provided (Figs. 11 and 13), to register with the port 26. A branch-pipe 48 is coupled at its upper end with each valve-casing at the end-port 46 therein and extends downward, being coupled at its lower end at a port in the tank-side near its bottom for conducting hot water, provided as hereinafter described, into the bottom of the tank.

A supply-pipe 49 for live steam extends across one end of the two tanks (Fig. 2) and is connected at the outer side of the tank 16 with the pipe 22, near which it is provided at 50 with a shut-off valve for controlling the admission of steam into that pipe for a purpose hereinafter explained; and the steam-pipe is provided adjacent to the outer side of the tank 15 with a branch 51 containing a shut-off valve at 52 and leading to a steam-jet pump 53, the detailed construction of which is shown in Fig. 6 to involve that described as follows: Into one end of a T-coupling 54, forming a casing, is screwed a nozzle 55 having lateral inlet-ports 56. Another, smaller, nozzle 57 is screwed into the outer end of the nozzle 55 to extend concentrically therewith and has at its outer end a right-angled connection with the steam-pipe branch 51, this last-named nozzle being closed at its outer end to afford a bearing for the reciprocating stem 58 of a valve 59 for controlling the flow of steam through the nozzle 57. This valve contains lateral ports 60 leading into a chamber 61 in the valve, which also contains a discharge-passage 62 leading from the inner end of the chamber to the extremity of the valve, so that a slight flow of steam may be maintained through the valve 59, when it is closed, from the branch 51. Within the casing 54 a third nozzle 63, larger than the nozzle 55, is screwed upon the latter to extend concentrically therewith, being provided with lateral water-inlet ports 64, like the ports 56, and centered for its support in a pipe 65 coupled to one end of the T-coupling 54 and leading to a three-way valve 66, of ordinary construction, provided in the pipe 22. This construction of pump affords the two mixing chambers 67 and 68 for steam and water discharging into the pipe 65.

The casing 53 is connected by a pipe-section 70 with a T-coupling 71 containing a thermostat-device, which is preferably substantially the same as that fully shown and described in an analogous situation and for the same purpose in my pending application, Serial Number 379,530, filed June 17, 1907. This thermostat-device is shown in detail in Fig. 16: In a reducer 184 screwed into one end of the T-coupling or casing 71 is screwed the thermostat proper, consisting of a tube 185 closed at one end by a plug 186 and adapted to contain a fluid, such as ether, that will expand and contract under variations in temperature, this tube terminating at its opposite end in a tube 187 containing a reduced bore 188 and ending in a disk-shaped head 189 upon which is secured by a ring-nut 190 screwed upon the disk, a diaphragm 191, to the center of which the bore 188 opens. This end of the thermostat enters the casing of the spring-seated valve-device 77 in which is fulcrumed on the ring 190 an angular lever 193 bearing at one end against the center of the diaphragm and having a threaded vertical opening in its opposite end to receive a screw 194 passing through an opening 195 in the casing, beyond which it carries a dial-finger 196 within the casing 197 of a suitable dial.

To the casing 71 is coupled one end of a pipe 72 containing a thermometer 73 and having its opposite end connected with a three-way valve 74 interposed in the pipe 21 and of the same construction as the valve 66.

A diaphragm-device 75, of the same construction and serving the same purpose as the corresponding device in the aforesaid application, is connected with the outer end of the valve-stem 58, and is shown in detail in Fig. 15 to consist of a casing 178 supported on arms 179 and having its base formed of a flexible diaphragm 180 supported by springs 181 and centrally to which is fastened the stem 58 of the steam-jet pump, whereby reducing the air-pressure against the upper side of the diaphragm raises the valve 59. An air-pressure pipe 76 leads to the diaphragm-device from an incased spring-seated valve-device, indicated at 77, for controlling, under the action of the thermostat-device, the supply of air-pressure through a pipe 69 (Fig. 4) to the diaphragm-device; this spring-seated valve being regulable from an indicator connected with a lever fulcrumed to engage with another diaphragm-device in the casing, into which last-named device the thermostatic-fluid expands. The incased spring-seated valve-device thus referred to is shown in detail in its connection with the thermostat-device in Fig. 16, and it involves the following-described construction: Within the casing 77 the air-supply pipe 69 and air-conducting pipe 76 leading to the diaphragm device are coupled together by a head 198 having a bracket-extension 199, at which it is screwed to an inner wall of the casing. This head contains a valve-chamber 200 housing a ball-valve 201 supported on a spring 202 in the passage leading from the end of the pipe 69 in the head, and a plunger-rod 203, passing through a relatively wide bore 204 in a plug 205 screwed into the upper end of the head, bears at one end against the ball-valve and coincides at its opposite end with the screw 194. By means of the thermostat-device, when water passing through the pipe 70 attains a certain predetermined temperature, the heat, by expanding the fluid in the tube 185, causes it to raise the diaphragm 191, thereby actuating the lever 93 to depress the screw 194 against the plunger 203 and open the valve 201. Thus opening the valve admits air-pressure from the pipe 69 to the pipe 76 through which it acts against the diaphragm 180 to depress the rod 58 and seat the valve 59, thereby shutting off the steam-supply for heating the water until the water in the pipe 70 is properly lowered in temperature to contract the thermostat-fluid and permit consequent lowering of the diaphragm 191 to be followed by the contacting end of the lever 193 under the recoil-action of the spring 202 to raise the ball-valve against its seat and shut off the air-supply to the pipe 76. Thereupon the air under pressure against the diaphragm 180 escapes by way of the pipe 76 through the opening 204 about the plunger 203 working in the plug 205, and discharges through a vent-opening 206 in the casing 77, with the result that the springs 181 are freed to restore the diaphragm 180 to its normal position of opening the valve 59 for resuming the flow of steam. By screwing the adjusting-screw 194 into the lever 193 to raise the adjacent end thereof, the opposite end of the lever is pressed against the diaphragm 191 to adapt it to turn the lever under a lesser force of expansion of the thermostat-fluid and thus to shut off the steam-supply at a lower temperature of the water in the pipe 70; and by turning the screw in the opposite direction, a higher temperature of the thermostat-fluid will be required to effect opening of the valve 201. The dial-device 197 may be set for shutting off the steam at any desired temperature by removing the cover with which it is shown to be provided (and which should be transparent) to permit access to the finger 196 for turning its work the screw 194 and for setting the finger with relation to a suitable gage (not shown) marked on the dial over which the finger moves to indicate the predetermined pressure for the run of the apparatus.

A water-pipe 78 connects the two tanks at one end near their bases; and the tanks are provided below their tops, on opposite ends, respectively, with overflow-pipes 79 and 80, leading preferably to a sewer.

For circulating the water in the tanks through them, a pump is provided preferably in the form of a steam-jet pump 81, shown in detail in Fig. 7, and involving the following-described construction: A T-shaped casing 82 has its horizontal branch connected with a pipe 83 leading out of the tank 15 near its top below the overflow-level, at the end opposite that at which the heating-pump 53 is provided. Into one end of this casing is screwed a tapering nozzle 84 containing lateral ports 85 and having screwed upon it within the casing a nozzle 86 containing lateral ports 87. A third nozzle 88 containing lateral ports 89 is screwed within the casing upon the nozzle 86 and is supported, to centralize it with the nozzles behind it, in a tube 90 screwed into the opposite end of the casing. Still another nozzle 91 is screwed into the outer end of the nozzle 84 to centralize it therewith and has screwed into its outer end a tapering bearing 92 for a needle-valve 93 having its stem 94, which works through a stuffing-box 95, pivotally connected at its outer end with a lever 96 fulcrumed at one end on a frame 97, presenting a segmental section 98 on its upper side, with which the handle-end of the lever is adapted to be releasably engaged for setting the needle-valve to control the admission into the pump of live steam, the nozzle 91 which enters through a pipe 99 extending from a suitable steam-supply (not shown). The nozzles thus described form mixing chambers 100, 101 and 102 for the steam with the water which enters the casing through the pipe 83. The pipe 90 communicates with the end of the tank 16 at a point corresponding to the connection of the pipe 83 with the tank 15; and this pipe 90 is surrounded by a water-jacket 103, plugged at its opposite ends about the pipe, and through which cold water is circulated from any suitable source through an inlet-pipe 104 and a discharge-pipe 105.

The operation is as follows, particular reference being had for elucidating the explanation to the diagrammatic representation in Fig. 1: All the compartments are filled, to the heights of the overflows from the tanks, with cold water through the pipe 19 and its branches by opening the valves 20 in the latter. When so filled, the contents of a desired number of the compartments are heated to the required pasteurizing temperature by opening the valves 23 on those compartments to the positions represented in Figs. 11 and 12, and starting the action of the jet-pump 53 by admitting steam into it on opening the valve 52. It may be supposed that the contents of the compartments numbered from 1 to 5, inclusive, in the tank 15 are to be thus initially heated, though the number will vary according to the length of time during which it is desired to maintain the beer to be pasteurized under subjection to the pasteurizing temperature, as will be more fully explained hereinafter. The action of the steam-jet in the heating pump 53 sucks the water from the upper portions of the five compartments through the ports 47 into the upper sections of the valve-plugs of the respective valves 23, whence it discharges into the pipe 21, wherein the three-way valve 74 has been opened to permit the flow, as has also the three-way valve 66 in the pipe 22. The valve 74 is so opened as to direct the flow from the pipe 21 through the pipe 72, past the thermostat-device 71 into the heater 53, whence it passes through the pipe 65 into the pipe 22 with the valve 66 therein so turned as to continue the flow in the pipe 22 in the opposite direction to that in the pipe 21, the suction being in the opposite direction to the discharge. In passing through the pump 53, the water and steam become throughly mixed in the mixing-chambers 67 and 68 in a manner to prevent stratification of the heat and produce uniform distribution thereof throughout the water, which enters the same compartments at their bases through the pipes 48 and lower sections of the respective valves 23. This heating circulation is maintained from and to the respective tanks through the endless pipes 21 and 22, and through the by-pass chambers 32 and 37 of the closed valves 23 in said pipes, until the contents of the five tanks are heated to the pasteurizing temperature. Thereafter this hot water is circulated throughout the series of compartments to supplant the cold water in each with the hot water from the initially heated tanks. This is done by any suitable pump, but preferably the steam-jet pump shown in Fig. 7, on opening its valve 93 to admit the passage of live steam through the pump for producing its operation in sucking the water through the pipe 83 from the narrow space in the adjacent end of the tank 15 produced by the respective end-partition therein, and discharging it into the corresponding space formed by the end-partition in the adjacent end of the tank 16 through the pipe 90. In this way a constant flow of the water in both tanks is maintained and the provision of the narrow spaces afforded by the end-partitions in the tanks assures circulation through the end-compartments, the contents of which would otherwise not discharge, but would tend to remain dormant. The partitions forming the compartments, by their alternating arrangement afford a serpentine course through the tanks, for the water, to cause its circulation.

The described construction of the pump 81 renders it adequately powerful for its circulating work on the large body of water to be circulated, the plurality and arrangement of nozzles in the pump adapting it to circulate the water with the minimum consumption of steam. When the lever 96 is once set to set the valve 93 for a given apparatus and for a given period of time for completing the circulation, it need not thereafter be disturbed unless the discharge-opening in the nozzle 91 should become clogged, when, by working the lever back and forth, the valve will dislodge the material which causes the choking. It is not desired, though it can not be avoided because of the necessary use of steam for operating the pump 81, to heat the water pumped by it; and to counteract the slight heating effect of the steam, the water-jacket 103 is provided.

With the contents of the first five compartments heated, as described, a gauntree 106, of any suitable construction, shown of double form to extend across both tanks and travel on tracks 107 provided to extend along the tops of their outer sides, is brought into use. The gauntree is designed to elevate into it bottle-racks 108, which may be stored in the tank-compartments, one in each, and to lower a rack into a compartment, loaded with beer to be pasteurized in bottles 109 contained in baskets 110 fitting the racks. The gauntree is first moved, with the particular arrangement of compartments shown and described, over the compartment 8, into which a rack of the bottles is lowered. This is done before the circulating pump 81 is started. Thereafter, the circulation of the water during a period of about seven and one-half minutes will have introduced the water into the compartment 6 at a temperature somewhat below 140° F., that in the compartment 7 at a lower temperature, and that in the compartment 8 at a temperature at which it is safe to immerse the bottles without danger of fracturing them. At the end of the aforesaid period, during which the compartment 9 is filled with cold beer, by the use of the gauntree, the valve 23 of compartment 1 is closed and that of compartment 6 is opened to circulate its contents from that compartment through the heating pump 53 and back into the same compartment, thereby to raise its contents to the pasteurizing temperature. The continued circulation of the water by the action of the pump 81 will transfer the contents of the compartment 6 into compartment 7, that in compartment 7 into compartment 8, and so on, thereby subjecting the bottles in the latter to a higher temperature. This consumes another period of about seven and one-half minutes, during which compartment 10 is filled with cold beer, when the valve 23 of compartment 2 is closed and that of compartment 7 is opened. The contents of the compartment 7 are thus circulated and heated by the pump 53. This procedure of closing a valve 23 of one compartment and opening that of another compartment is continued with the effect of gradually raising the temperature of the water in each compartment in succession, supplying heat by the action of the pump 53 to compensate for the loss through radiation and introducing the cold bottles, for heating the contents of each compartment in succession to the pasteurizing temperature, at which it is maintained for a period of about thirty minutes, until all of the compartments have been filled with bottles; after which, in the continuation of the working of the apparatus, a rack of bottles containing pasteurized beer will be taken by the gauntree out of one compartment (namely that numbered 8), which will thereupon be immediately refilled with a rack of cold bottles to be pasteurized by gradually raising the temperature of the water in that compartment in the manner already described. Thereafter the procedure is repeated of closing a valve 23 in one compartment and opening the similar valve in the compartment three-removed therefrom, and during the period of seven and one-half minutes consumed in completely changing the water from each compartment into another, taking out a rack of the bottles that has been finished, as to pasteurizing, and introducing into that compartment another rack of cold bottles.

The three-way valves 66 and 74 serve a peculiar purpose which is of importance because of the lack of uniformity of the flow of water through the heating pump out of the compartments. That is to say, in initially heating the first five compartments, with the three-way valves turned to the position described, the greater flow and return of water will be from and to the compartment 5, with less from the compartment 4, still less from the compartment 3, and so on to the first compartment, whereby when the temperature in the compartment 5 shall have reached 140° F. or the pasteurizing temperature, that in each preceding compartment will be lower, say to the extent of 5°, than the temperature in the next adjacent compartment in advance of it; whereas it is necessary that the same temperature (140° F.) shall be provided throughout all of the five compartments. When, therefore, the maximum temperature has been attained in the tank number 5, the three-way valves are turned to the opposite position, or that of changing the direction of flow to and from the heater, whereby the greater proportion of flow is from and to the compartment 1, decreasing gradually to compartment 5. In this way provision is made for equalizing the temperature in the five tanks. When the temperature in the five tanks has been thus equalized, the three-way valves are turned back to the original position. Moreover, by providing these three-way valves they enable the water being heated to pass through each in opposite directions in pipes 21 and 22, which is sometimes desirable.

When it is desired to expedite heating the contents of the first five compartments, this may be accomplished by opening the valve 50 to introduce live steam into the water discharging from the heater 53 through the pipe 22, to supplement the action of the heater.

In an apparatus employing the fourteen compartments shown and described, it requires about one hour and forty-five minutes, after heating up the contents of the first five tanks, to complete the circuit of pasteurization in each compartment. Thus, the beer will be subjected to the pasteurizing temperature in each compartment for a period of about thirty seven and one-half minutes, during twelve and one-half of which the pasteurizing heat will have penetrated and be maintained in the center of the beer in the bottles. Where it is desired, or the material treated requires that it be subjected to the pasteurizing temperature during a period of only five minutes, or thereabout, the initial heating may be confined to four tanks, since it requires only four times seven and one-half minutes, or thirty minutes, for the heated contents of the four compartments to pass the compartment filled with beer to be pasteurized as against five times seven and one-half, or thirty seven and one-half minutes so to pass the heated contents of five compartments. For the same reason, where the material to be pasteurized requires subjection to the pasteurizing temperature during a period of, say, twenty minutes, the contents of six compartments require to be initially heated since it will take the contents of these compartments six times seven and one-half minutes, or forty-five minutes to pass the compartment in which pasteurization is taking place, thereby affording twenty-five minutes for heating up the bottles and twenty minutes for maintaining that heat in the center of the beer.

As will be understood, the two tanks 15 and 16 are, practically, one, the two shown being provided as a mere matter of preference, for convenience in erection and installation. It will also be understood that while fourteen compartments are herein shown and described, the number may vary according to the capacity required and purpose of the apparatus; and that the initial heating of the water to the pasteurizing temperature may be confined to any desired number of the compartments, according to the capacity of the tank and the time required for completing the circuit of the water therethrough.

What I claim as new, and desire to secure by Letters Patent, is—

1. In a pasteurizing apparatus, the combination with a series of compartments for the pasteurizing liquid, forming a sinuous course for said liquid, an outlet and inlet pipe for each compartment in circuit therewith, a heating pump in said circuit and a circulating pump communicating at its suction and discharge sides, respectively, with the end compartments.

2. In a pasteurizing apparatus, the combination with a series of compartments for the pasteurizing liquid, forming a sinuous course for said liquid, an outlet and inlet pipe for each compartment in circuit therewith, a heating pump controllably communicating with all of said circuits, valves for controlling said communication, and a circulating pump communicating at its suction and discharge sides, respectively, with the end compartments.

3. In a pasteurizing apparatus, the combination with a tank for the pasteurizing liquid containing alternating partitions, forming compartments and a sinuous course through them for said liquid, an outlet and inlet pipe for each compartment in circuit therewith, a heating pump in said circuit and a circulating pump communicating at its suction and discharge sides, respectively, with the end compartments.

4. In a pasteurizing apparatus, the combination with a tank for the pasteurizing liquid, of alternating partitions in said tank forming compartments therein and a sinuous course through them for the liquid, the end partitions forming with the tank-walls relatively narrow spaces, an outlet and an inlet pipe for each compartment in circuit therewith, a heating pump for the liquid communicating with each circuit, a valve for controlling the communication, and a circulating pump communicating at its suction and discharge ends, respectively, with said relatively narrow spaces in the tank ends.

5. In a pasteurizing apparatus, the combination with a series of compartments for the pasteurizing liquid forming a sinuous course for the liquid, of a pair of pipes extending about said compartments, a heating pump communicating with said pipes, valve devices, one for each compartment, connected with both said pipes, outlet and inlet pipes for each compartment in circuit therewith and communicating through said valve device, and a circulating pump communicating at its suction and discharge sides, with the end compartments.

6. In a pasteurizing apparatus, the combination with a series of compartments for the pasteurizing liquid forming a sinuous course for the liquid, of a pair of pipes extending about said compartments, a heating pump communicating with said pipes, valve devices, a three-way valve in each of said pipes, and a circulating pump communicating at its suction and discharge sides, respectively, with the end compartments.

7. In a pasteurizing apparatus, the combination with a series of compartments for the pasteurizing liquid forming a sinuous course for said liquid, outlet and inlet pipes for each compartment in circuit therewith, a valve for each circuit, a steam-jet heating pump for the liquid controllably communicating with each compartment through its valve, a valved steam-supply pipe leading to said pump, and a circulating pump communicating at its suction and discharge sides, respectively, with the end compartments.

8. In a pasteurizing apparatus, the combination with a series of compartments for the pasteurizing liquid, a pair of pipes extending about said compartments, a steam-jet pipe communicating with said pipes, a steam-supply pipe leading to said pump, valve devices, one for each compartment connected with both said pipes, outlet and inlet pipes for each compartment connected to said valve-devices and in circuit with said compartments, whereby the communication between the pump and each compartment is controlled, and a circulating pump communicating at its suction and discharge sides, with the end compartments.

9. In a pasteurizing apparatus, the combination with a series of compartments for the pasteurizing liquid, an inlet and outlet pipe for each compartment in circuit therewith, a valve in said circuit, a steam-jet heating pump for the liquid in said circuit, said pump consisting of a casing containing a plurality of nozzles forming intercommunicating mixing chambers, and a regulable steam-inlet valve in the end-nozzle, a steam-supply pipe leading to said pump, and a circulating pump communicating at its suction and discharge sides, respectively, with the end-compartments.

10. In a pasteurizing apparatus, the combination with a series of compartments for the pasteurizing liquid forming a sinuous course for the liquid, a pair of pipes extending about said compartments, a heating pump communicating with said pipes, an outlet and inlet pipe for each compartment in circuit therewith, valve devices for each compartment in said circuit and connecting said circuit to said pair of pipes, and means communicating with the end compartments to cause a circulation through all said compartments.

11. In a pasteurizing apparatus, the combination of a series of compartments for the pasteurizing liquid, forming a sinuous course for the liquid, a pair of pipes extending about said compartments, a heating pump communicating with said pipes, valve-devices, one for each compartment, each consisting of a casing containing a by-pass chamber provided with ports and divided into an upper section and a lower section, and a rotary plug-valve in the casing provided with ports and formed with an upper section and a lower section communicating, respectively, with a compartment at the upper and lower portions thereof, the casing extending through both said pipes, and a circulating pump communicating at its suction and discharge sides, respectively, with the end-compartments, for the purpose set forth.

12. In a pasteurizing apparatus, the combination of a series of compartments for the pasteurizing liquid, forming a sinuous course for the liquid, a pair of pipes extending about said compartments, a heating pump communicating with said pipes, valve-devices, one for each compartment, each consisting of a casing provided with outer and inner walls forming a by-pass chamber and having ports, with a partition dividing said chamber into an upper section and a lower section, and a rotary plug-valve in said casing provided with ports and formed with an upper section and a lower section communicating, respectively, with a compartment at the upper and lower portions thereof, the casing extending through both said pipes, and a circulating pump communicating at its suction and discharge sides, respectively, with the end-compartments, for the purpose set forth.

13. In a pasteuring apparatus, the combination of a series of compartments for the pasteurizing liquid, forming a sinuous course for the liquid, a pair of pipes extending about said compartments, a heating pump communicating with said pipes, valve-devices, one for each compartment, each consisting of a casing interposed in both said pipes and containing a by-pass chamber extending part way about the casing with a partition dividing said chamber into an upper section and a lower section with ports forming passages through the chamber, and a rotary plug-valve in said casing provided with ports and containing a partition forming an upper section and a lower section communicating, respectively, with a compartment at the upper and lower portions thereof, and a circulating pump communicating at its suction and discharge sides, respectively, with the end-compartments, for the purpose set forth.

14. In a pasteurizing apparatus, the combination with a series of compartments for the pasteurizing liquid, of means for causing the liquid to circulate successively through said series, an outlet and inlet pipe for each compartment in circuit therewith, and means connected to said outlet and inlet pipe for causing a circulation therethrough and for changing the temperature of the liquid.

JOHN T. H. PAUL.

In presence of—
  A. W. THORIEN,
  R. A. SCHAEFER.